United States Patent [19]

Jansen

[11] Patent Number: 5,452,523

[45] Date of Patent: Sep. 26, 1995

[54] MEASURING MATERIAL LENGTHS

[75] Inventor: George Jansen, Denver, Colo.

[73] Assignee: Band-It-Idex, Inc., Denver, Colo.

[21] Appl. No.: 212,564

[22] Filed: Mar. 11, 1994

[51] Int. Cl.⁶ .............................. G01B 3/10; B65D 63/00
[52] U.S. Cl. .............. 33/555.4; 33/755; 33/771; 33/494; 24/23 R
[58] Field of Search .................. 33/555.4, 732, 33/755, 758, 771, 494, 679.1; 24/23 R, 23 W

[56] References Cited

U.S. PATENT DOCUMENTS

| 1,479,431 | 1/1924 | Gerrard et al. | 24/23 R |
|---|---|---|---|
| 2,262,664 | 11/1941 | Bresson | 33/555.4 |
| 4,332,087 | 6/1982 | Ellis . | |
| 4,679,325 | 7/1987 | Sweatman . | |
| 4,768,410 | 9/1988 | Wood . | |
| 4,781,090 | 11/1988 | Feldkamper et al. . | |
| 5,012,590 | 5/1991 | Wagner et al. | 33/759 |
| 5,103,571 | 4/1992 | Richards | 33/555.4 |
| 5,107,601 | 4/1992 | Semchuck | 33/759 |

FOREIGN PATENT DOCUMENTS

| 1515464 | 3/1968 | France | 33/555.4 |
|---|---|---|---|
| 2817413 | 10/1979 | Germany | 24/23 R |

Primary Examiner—Alvin Wirthlin
Attorney, Agent, or Firm—Sheridan Ross & McIntosh

[57] ABSTRACT

A banding material is disclosed for use as the band in a band clamp. The banding material is provided from a roll of banding material from which a length of the banding material corresponding to the length of the desired band is cut. The length of the band for the band clamp is determined by counting markings on the band which are related to the diameter of an object about which the band clamp is to be fitted. In a preferred embodiment, the markings are $\pi$ units, or fraction of $\pi$ units, apart where the diameter of the object is measured in the same units.

11 Claims, 2 Drawing Sheets

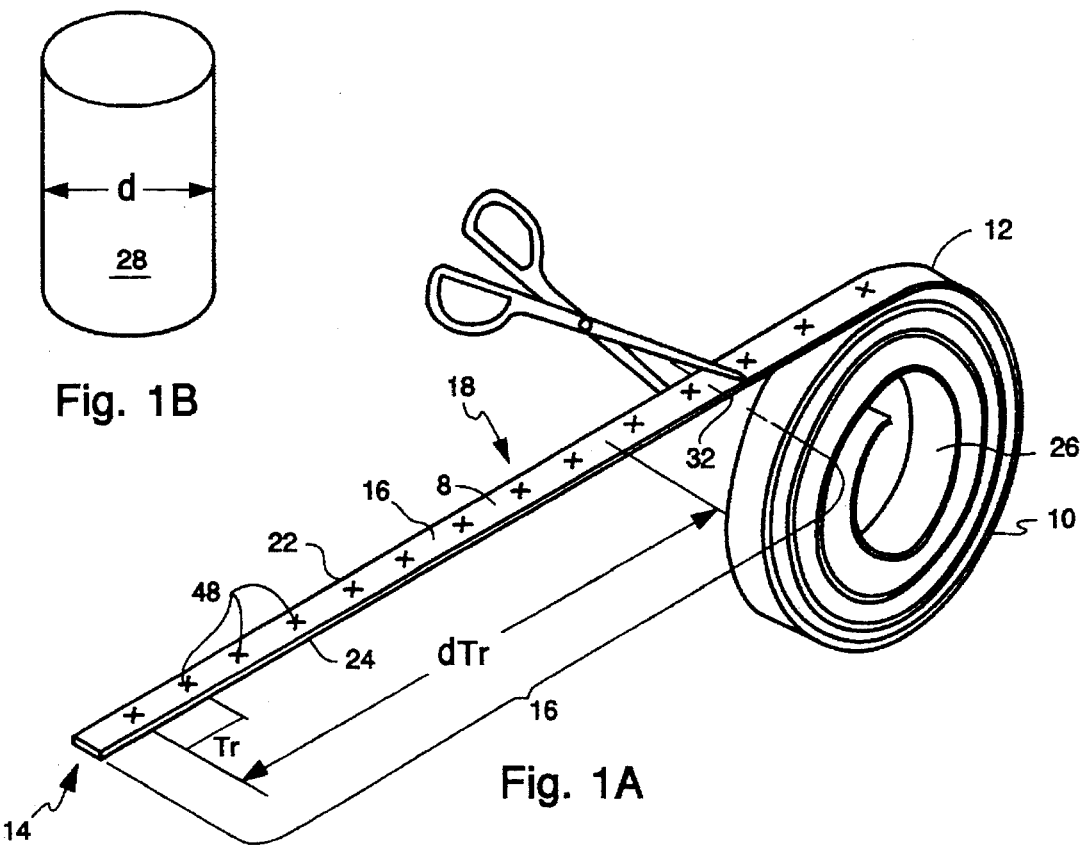
Fig. 1B
Fig. 1A
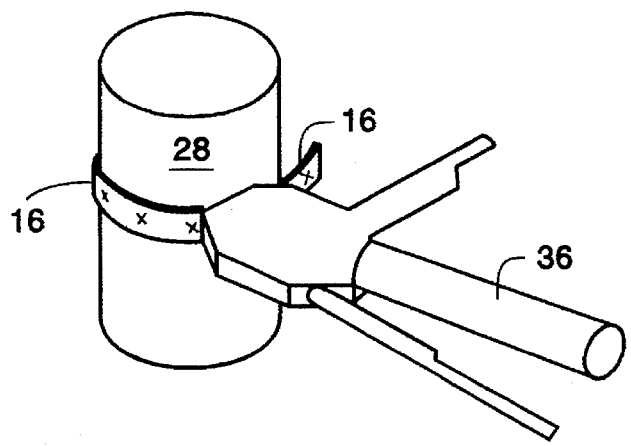
Fig. 2
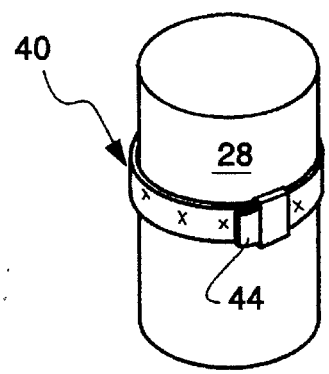
Fig. 3

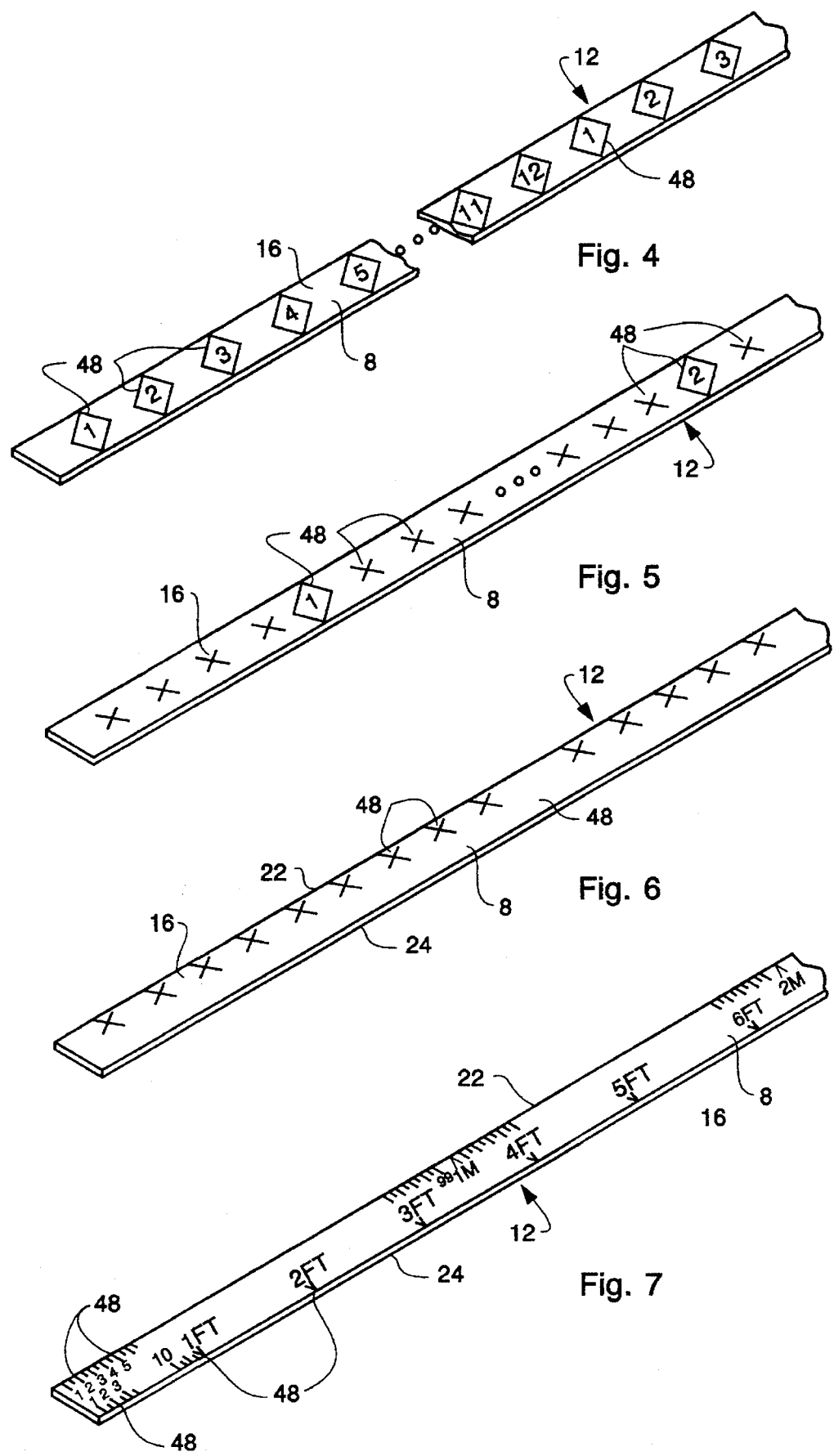

5,452,523

MEASURING MATERIAL LENGTHS

FIELD OF THE INVENTION

The present invention relates to determining a length of a band used in forming a band clamp.

BACKGROUND OF THE INVENTION

The process of providing a band clamp about an object typically requires a measurement of a circumference of an object about which the band clamp is to be placed. Subsequently, using this measurement, a determination of a length of banding material to be severed from a band roll is made. That is, the severed length becomes the band for the band clamp. In particular, the length of band must at least span the object's circumference with sufficient excess band to allow a banding tool to tighten and fix the band to the object. Alternatively, the object's diameter or radius can be measured and subsequently this value can be used to calculate the object's circumference so that an appropriate length of banding material can be cut from the band roll. In either case, a length of banding material must be measured prior to cutting to assure the band for the band clamp encloses the object without a shortfall or substantial excess in length of banding material. Thus, it would be advantageous to simplify such band clamping processes whereby measurement of the banding material prior to cutting it from the band roll is simpler. In particular, it would be advantageous to have a simpler way to determine the length of the banding material required for a band.

SUMMARY OF THE INVENTION

The present invention provides designations or markings on a banding material of a band roll such that the markings provide assistance in determining a length of the banding material sufficient to surround an object and subsequently form a band clamp about the object. In one preferred embodiment, the markings are along the length of the banding material at integral multiples of $\pi$ ($\approx 3.1416$) units for a predetermined linear unit of measurement (e.g., inches, feet, or centimeters). Thus, when a diameter of an object about which a band clamp is to be fitted is known in the same predetermined units, an appropriate length of banding material for the band of the band clamp can be readily determined by counting consecutively the markings on the banding material. That is, starting from a free end of the banding material, the $\pi$ unit interval markings can be counted until the count is greater than the diameter of the object to be band clamped. In a preferred embodiment, a band of sufficient length is obtained by counting one or two markings beyond the minimal count required for a band length longer than the object's circumference. That is, by providing this additional band length, a banding tool can be used to tighten the band about the object and subsequently form a lock on an end of the band thereby fixing the band clamp to the object.

A more detailed disclosure of the present invention and its features and benefits will become apparent from the figures and the description hereinafter.

BRIEF DESCRIPTION OF THE DRAWINGS

FIG. 1A shows the banding material markings 48 of the present invention;

FIG. 1B shows an object 28 about which a band clamp is to be fitted using a band 16 severed from the banding material 18;

FIG. 2 illustrates the use of a banding tool 36 in forming a band clamp with the band 16;

FIG. 3 shows a completed band clamp 40 about the object 28; and

FIG. 4 illustrates markings on the surface 8 of the banding material 12 wherein the markings are diamond shaped with numeric labels within the diamonds;

FIG. 5 illustrates markings on the surface 8 of the banding material 12 wherein the markings for a smaller unit of measurement are designated by non-numeric markings and the markings for a larger unit of measurement are designated with diamonds having numeric labels therein;

FIG. 6 illustrates markings on the surface 8 of the banding material 12 wherein lengths of a smaller unit of measurement are marked adjacent to one longitudinal edge of the banding material 12 while lengths of a larger unit of measurement are marked adjacent to the opposite longitudinal edge of the banding material 12;

FIG. 7 illustrates markings on the surface 8 of the banding material 12 wherein lengths of $\pi$ centimeters and $\pi$ meters are marked adjacent one longitudinal edge of the banding material 12 while lengths of $\pi$ inches and $\pi$ feet are marked adjacent to the opposite longitudinal edge of the banding material 12.

DETAILED DESCRIPTION

Referring to FIG. 1A, a roll or coil 10 of banding material 12 used in forming a band clamp is shown. A portion of the banding material 12, unrolled from a free end 14, is displayed generally at 18. In the preferred embodiment, the banding material 12 has opposed surfaces 8 and 26, as well as opposed edges 22 and 24 running the length of the banding material. Shown in FIG. 1B is an object 28 about which a band clamp is to be placed using the banding material 12, the object having a diameter of d units. In order to provide a band clamp 40, as in FIG. 3, surrounding object 28, a band 16 must be cut from the banding material 12 of the band roll 10. The band length to be cut should be somewhat greater than the circumference of object 28; i.e., greater than $d\pi$. For example, the banding material 18 extending from free end 14 to the dashed line 32 provides a sufficiently long band 16 for use in banding object 28. That is, in addition to the $d\pi$ length, there is sufficient band excess such that the band 16 can be tightened and locked about object 28. In particular, a portion of the excess band beyond the $d\pi$ length is used in a banding tool 36, as illustrated in FIG. 2, for tightening the band 16 about object 28 and subsequently forming a lock 44 as shown in FIG. 3. That is, a band clamp 40 (FIG. 3) is secured about the object 28 by the lock 44 formed on one end of the band 16, this band end overlapping a portion of the band substantially near its other end.

To determine the length of the band 16, note that the banding material 12 has markings 48 that are $\pi$ units apart (the units being the same as the units used to obtain d as the diameter of the object 28), when $d \geq 1$ unit or about=1 unit. Thus, to obtain an appropriate band length, a user desiring to form the band clamp 40 determines the diameter, d, for the object 28 and subsequently counts off an integral number of consecutive markings 48 on the surface 8 of the banding material 18 such that the number of markings counted is greater than the diameter of the object. For example, if the diameter of the object 28 is 8.1 inches, then by counting off nine consecutive markings 48 on the unrolled banding material portion 18, a sufficient amount of banding material for the band 16 to wrap around object 28 will be obtained.

Further, by exceeding this amount by enough banding material 12 to use the banding tool 36 to tighten and form a band lock 44 about object 28, a sufficient amount of band length is obtained to form the band clamp 40. Thus, referring again to FIG. 1A, by cutting the unrolled banding material portion 18 at the dashed line 32, a band 16 sufficiently long is obtained. It should be understood that, when d<1 unit or a fraction of 1 unit (not about=1 unit), the band 16 would include spaced markings 48 that are fractions of π, e.g., ¼ π or ½ π.

Alternative embodiments of the markings 48 are also contemplated. In particular, FIGS. 4–7 present various preferred embodiments of the invention. In FIG. 4, for example, markings 48 on the surface 8 are diamond shaped with numerical labels within the diamonds. The markings here indicate units in inches or, more precisely, lengths between markings of π inches. Further, note that the numerical labels increase from one to twelve and then revert back to one, thus allowing easy determination of markings 48 corresponding to banding material 12 measurements in feet as well as inches.

FIG. 5 presents another preferred embodiment of the invention. In this embodiment, the smallest units are designated by non-numeric markings 48, whereas larger measurement units are marked with diamonds having numeric labels. In this embodiment, the numeric labels may repeat modulo some number such as twelve or one hundred.

In FIG. 6, a two-tiered system of markings 48 is presented wherein the smaller unit lengths (e.g., π inches, or a fraction thereof) are marked adjacent edge 22 of the banding material 12 while longer unit lengths (e.g., π feet) are marked adjacent edge 24.

FIG. 7 illustrates an embodiment of the invention wherein, for example, unit lengths in π centimeters and π meters are marked adjacent the edge 22 while unit lengths in the π inches and π feet are marked adjacent the edge 24.

In addition, note that various other embodiments of the invention are contemplated. In particular, markings 48 may appear on both surfaces 8 and 26.

The foregoing discussion of the invention has been presented for purposes of illustration and description. Further, the description is not intended to limit the invention to the form disclosed herein. Consequently, variation and modification commensurate with the above teachings, in the skill and knowledge of the relevant art, are within the scope of the present invention. The embodiment described hereinabove is further intended to explain the best mode presently known of practicing the invention and to enable others skilled in the art to utilize the invention as such or other embodiments, and with the various modifications required by their particular application or use of the invention. It is intended that the appended claims be construed to include alternative embodiments to the extent permitted by the prior art.

What is claimed is:

1. A banding material for use in providing a band for a band clamp that is positionable about an object, comprising:

band roll means for dispensing said banding material to form said band, said banding material having a length and a width extending between opposed first and second edges of said banding material, all of said banding material of said band roll means being substantially straight throughout its length and having substantially the same thickness throughout its length;

measurement means for determining a desired length for said band from said banding material, said desired length measured along said length of said banding material, said desired length being related to a circumference of the object, said measurement means including designations on said banding material, each consecutive pair of designations designating a predetermined length of said banding material in a first predetermined unit of measurement, said first predetermined unit of measurement related to a different second predetermined unit of measurement, said second predetermined unit of measurement used for measuring a geometric characteristic of the object different from the circumference wherein a numeric value of a measurement of the geometric characteristic in the second unit of measurement is used in determining a number of said predetermined lengths included in said desired length, with the geometric characteristic being a diameter of the object and the measurement thereof being conducted using a diameter measuring means that is different from said measurement means having said designations;

wherein said band is provided by cutting said banding material across said width to define a cut end of said band and in which portions of said band adjacent to said cut end are substantially straight and have substantially the same thickness as said cut end, with said desired length for said band being a length that is at least one predetermined length greater than the numeric value of the number of consecutive predetermined lengths of said banding material that are determined based on the second predetermined unit of measurement.

2. A banding material, as claimed in claim 1, wherein:

at least one of said predetermined lengths is one of a fraction of and a multiple of π units of the second predetermined unit of measurement.

3. A banding material, as claimed in claim 1, wherein:

said designations are provided on one of said first edge, said second edge and a surface of said banding material.

4. A banding material, as claimed in claim 1, wherein:

said designations are along said length of said banding material.

5. A banding material, as claimed in claim 1, wherein:

said banding material has a free end edge, said free end edge terminating said banding material across the width.

6. A banding material, as claimed in claim 5, wherein:

said band has an opposite end edge which opposes said free end edge, said opposite end edge created by the cutting across the width of said banding material.

7. A banding material, as claimed in claim 6, wherein:

a portion of said banding material near said opposite end edge and a portion of said banding material near said free end edge overlap each other.

8. A banding material, as claimed in claim 1, wherein:

said designations on said banding material include designations of a third predetermined unit of measurement different from said designations of said first predetermined unit of measurement wherein a length of banding material traversing between designations of said third predetermined unit of measurement includes an integral number of said predetermined lengths of said first predetermined unit of measurement and said third predetermined unit of measurement is provided on the same surface of said banding material as said first predetermined unit of measurement.

9. A banding material, as claimed in claim 1, wherein:
said designations include numerical labels used for determining a number of said designations related to the desired length for said band.

10. A method for providing a desired length of banding material to fit about a circumference of a first object, comprising:

providing a continuous amount of banding material in a lengthwise direction, said banding material having designations for denoting consecutive intervals of said banding material using a first predetermined unit of measurement, each said interval having a predetermined length in the lengthwise direction, said banding material being substantially straight throughout its entire length and having substantially the same thickness throughout its entire length;

obtaining a measurement of a geometric characteristic of the first object in a second predetermined unit of measurement different from the first predetermined unit of measurement, said geometric characteristic being a diameter of the first object and said obtaining step being conducted using diameter measuring means that is different from said banding material having said designations;

determining said desired length of banding material by using a numeric value of said measurement as a value in said first predetermined unit of measurement for counting said intervals of said first predetermined unit of measurement consecutively in said lengthwise direction from a first free end of said banding material until said count is related to said numeric value in a predetermined manner; and cutting across a width of said banding material to define a cut end, wherein portions of said length of banding material adjacent to said cut end are substantially straight and have substantially the same thickness as said cut end and said desired length of banding material being at least one interval greater than said intervals that are counted consecutively based on the second predetermined unit of measurement.

11. A method, as claimed in claim 10, wherein:
a ratio of an interval of unit length in said first predetermined unit of measurement to an interval of unit of length in said second predetermined unit of measurement is one of a fraction of $\pi$ and an integer multiple of $\pi$.

* * * * *